US012276458B2

(12) United States Patent
Ricke et al.

(10) Patent No.: US 12,276,458 B2
(45) Date of Patent: Apr. 15, 2025

(54) METHOD FOR MAINTENANCE OF A COOLING ASSEMBLY FOR A METALLURGICAL FURNACE

(71) Applicants: PAUL WURTH S.A., Luxembourg (LU); PAUL WURTH DEUTSCHLAND GMBH, Wiesbaden (DE)

(72) Inventors: Marco Ricke, Coesfeld (DE); Rene Schneider, Goch (DE); Frank Tennagels, Bottrop-Kirchhellen (DE); Nicolas Maggioli, Thionville (DE)

(73) Assignees: PAUL WURTH S.A., Luxembourg (LU); PAUL WURTH DEUTSCHLAND GMBH, Wiesbaden (DE)

( * ) Notice: Subject to any disclaimer, the term of this patent is extended or adjusted under 35 U.S.C. 154(b) by 516 days.

(21) Appl. No.: 17/633,775

(22) PCT Filed: Aug. 4, 2020

(86) PCT No.: PCT/EP2020/071913
§ 371 (c)(1),
(2) Date: Feb. 8, 2022

(87) PCT Pub. No.: WO2021/028267
PCT Pub. Date: Feb. 18, 2021

(65) Prior Publication Data

US 2022/0276004 A1 Sep. 1, 2022

(30) Foreign Application Priority Data

Aug. 9, 2019 (LU) ........................................ 101347
Oct. 31, 2019 (LU) ........................................ 101462

(51) Int. Cl.
*F27D 1/12* (2006.01)
*C21C 5/46* (2006.01)
(Continued)

(52) U.S. Cl.
CPC .............. *F27D 1/12* (2013.01); *C21C 5/4646* (2013.01); *F27D 2001/0046* (2013.01); *F27D 2009/0024* (2013.01); *F27D 2009/0029* (2013.01)

(58) Field of Classification Search
CPC ............... F27D 1/12; F27D 2001/0046; F27D 2009/0024; F27D 2009/0029; F27D 9/00;
(Continued)

(56) References Cited

U.S. PATENT DOCUMENTS 4,314,695 A 2/1982 Widmer
4,397,450 A * 8/1983 Kammerling ............. F27D 1/12 432/238
(Continued)

FOREIGN PATENT DOCUMENTS

AU 2010332508 B2 6/2011
CA 1126951 A 7/1982
(Continued)

OTHER PUBLICATIONS

International Search Report issued Nov. 5, 2020 re: Application No. PCT/EP2020/071913, pp. 1-3.
(Continued)

*Primary Examiner* — Rick K Chang
(74) *Attorney, Agent, or Firm* — CANTOR COLBURN LLP

(57) ABSTRACT

A cooling assembly for a metallurgical furnace
- includes a cooling plate disposed inside of a furnace shell of the metallurgical furnace;
- a cooling pipe traversing a shell opening in the furnace shell and being connected to the cooling plate; and
- a compensator disposed around the cooling pipe for forming a seal between the cooling pipe and the furnace shell.

In order to provide ways for facilitating repair of a cooling system of the metallurgical furnace, the method includes at least the step of performing at least one cutting operation with a cutting device having a fixture and a cutting tool movably connected to the fixture for a guided movement with respect to the fixture. The fixture is mounted to the cooling pipe, whereby the cutting device is aligned with respect to the cooling pipe, and the cutting tool is guidedly moved while performing the cutting operation.

15 Claims, 4 Drawing Sheets

(51) Int. Cl.
*F27D 1/00* (2006.01)
*F27D 9/00* (2006.01)

(58) Field of Classification Search
CPC . C21C 5/4646; C21B 7/10; F27B 1/24; F27B 3/24
See application file for complete search history.

(56) References Cited

U.S. PATENT DOCUMENTS

| | | | | |
|---|---|---|---|---|
| 2009/0087274 | A1 | 4/2009 | Hall | |
| 2013/0203007 | A1* | 8/2013 | Smith | F27D 1/12 228/101 |
| 2018/0149429 | A1* | 5/2018 | Smith | F27D 1/004 |

FOREIGN PATENT DOCUMENTS

| | | | |
|---|---|---|---|
| CN | 103866063 | A | 6/2014 |
| CN | 104928424 | A | 9/2015 |
| DE | 29608464 | U1 | 7/1996 |
| EP | 0015049 | A1 | 9/1980 |
| EP | 1391521 | A1 | 2/2004 |
| EP | 1466989 | A2 | 10/2004 |
| GB | 2077152 | A | 12/1981 |
| JP | 861107090 | A | 5/1986 |
| JP | H01193101 | A | 8/1989 |
| JP | 2002060818 | A | 2/2002 |
| JP | 2005535865 | A | 11/2005 |
| JP | 2016108607 | A | 6/2016 |
| SU | 855357 | A1 | 8/1981 |
| SU | 1611938 | A1 | 12/1990 |
| TW | 201831696 | A | 9/2018 |
| WO | 2004018713 | A1 | 3/2004 |
| WO | 2011073660 | A1 | 6/2011 |

OTHER PUBLICATIONS

Written Opinion issued Nov. 5, 2020 re: Application No. PCT/EP2020/071913, pp. 1-6.
Chinese Office Action for Chinese Application No. 202080057420.7, dated Mar. 31, 2023, 13 pages with translation.
Japanese Office Action for Application No. P2022-507723, dated Jul. 2, 2024, 5 pages with translation.
Taiwanese Office Action for Application No. 109126982, dated Sep. 4, 2024, 10 pages with translation.

* cited by examiner

METHOD FOR MAINTENANCE OF A COOLING ASSEMBLY FOR A METALLURGICAL FURNACE

TECHNICAL FIELD

The disclosure relates to method for maintenance of a cooling assembly for a metallurgical furnace.

BACKGROUND

Cooling plates, also called cooling staves, are used in metallurgical furnaces, e.g. in blast furnaces, as part of a cooling system of the furnace. They are arranged on the inside of the outer shell of the furnace. Their surface facing the interior of the furnace can be lined with a refractory material. The cooling plates have internal coolant channels that are connected to other parts of the cooling system, e.g. by cooling pipes, which supply a coolant, generally water. The cooling pipes are guided through boreholes in the outer steel shell of the furnace. According to one design, the cooling staves as well as the cooling pipes are made of copper (or a copper alloy) and are connected by a weld.

Due to wear and thermal stress during operation, the copper stave bodies may deform, e.g. into a bent or "banana" shape. Due to this deformation, the position and the angle of the cooling pipes change with respect to the outer shell of the blast furnace. In order to absorb a certain part of this deformation and to close the holes of the blast furnace shell in a gas-tight manner, it is known to weld a so-called compensator between the furnace shell and the cooling pipes, as is disclosed e.g. in EP 1 466 989. This compensator, which forms a kind of collar around the cooling pipe, is commonly welded to the furnace shell and to the cooling pipe. The compensator can only absorb a certain degree of deformation. If this degree of deformation is exceeded, the compensator forms a fix point for the cooling pipe. During the operation of the furnace, the stave body often deforms even further, which results in a load on the cooling pipe. This load is transferred from the fix point to the connection between the stave body and the cooling pipe and thus into the weld. This, in turn, can lead to cracks in the weld, resulting in leakage and thus in water entering the furnace.

While it is clear that such leakage is to be avoided, any repair or replacement of the compensator is difficult to say the least and is practically impossible without a stoppage of the furnace. Another problem is that the compensator itself may be damaged, leading to gas leakage and/or corrosion. Also, material from inside the blast furnace may enter the compensator, thereby impairing its compensation function. A simplified, safe repair concept for dismantling such non-functional compensators and assembling new repair compensators is needed. Above all, the removal of the weld seams between the compensator and the cooling pipe causes problems. If these weld seams are removed by a burner or a cutting torch, this could damage the cooling pipe.

Another problem is that not only the compensator, but also the blast furnace shell may be a fix point for the cooling pipe if it is considerably deformed. This can be determined in advance by an endoscopy during a blast furnace stoppage, sometimes it is visible only after disassembly of the compensator. In such a case, an enlargement of the blast furnace shell opening is imperative before the installation of the new compensator to rebuild the free movement of the cooling tube. Again, there are massive difficulties in performing such an enlargement without risking any damage to the cooling pipe. Therefore, the necessary enlargement is oftentimes not performed at all. Thus, even after replacement of the compensator, the cooling pipe is still restricted in its movement.

Any repair measures can only be carried out during a shutdown of the furnace. For economic reasons, the shutdown time needs to be kept as short as possible, wherefore all repair or replacement works are time critical.

SUMMARY

Thus, the present disclosure provides means for facilitating repair of a cooling system of a metallurgical furnace. This is solved by providing a method according to claim 1.

The disclosure provides a method for maintenance of a cooling assembly for a metallurgical furnace. The furnace may be a shaft furnace, in particular a blast furnace. It is understood that the cooling assembly facilitates cooling of a furnace shell or outer shell of the furnace. The method for maintenance may in particular be a method for repairing the cooling assembly. "Repairing" in this context may in particular refer to removing one or several elements of the cooling assembly and replacing them with one or several new elements. However, the method may be applied in cases where there is no damage to the cooling assembly (yet) so that it may also be referred to as a method for retrofitting or upgrading the cooling assembly.

The cooling assembly comprises a cooling plate disposed inside of a furnace shell of the metallurgical furnace. The cooling plate, which can also be referred to as a cooling panel or cooling stave, is installed inside of a furnace shell of the metallurgical furnace. It may be arranged in parallel or concentric to the furnace shell. The cooling plate may be made of a single piece of metal, e.g. by casting. Although the disclosure is not limited to this, the cooling plate is preferably made of a metal that comprises copper, i.e. it is made of copper or a copper alloy. Cooling plates are often also made from steel. It has a front face facing the inside of the metallurgical furnace, i.e. the front face is oriented towards the inside of the furnace. In order to increase the surface area of the front surface, the front surface may comprise a plurality of ribs, with two consecutive ribs being spaced by a groove. Normally, the cooling system of the metallurgical furnace comprises a plurality of cooling plates which more or less protect the entire furnace shell from excessive heat. Optionally, at least one surface of the cooling plate could be provided with a refractory lining to protect the surface from excessive heat and/or mechanical abrasion. As known in the art, the cooling plate comprises at least one coolant channel inside the cooling plate. The coolant channel is an elongate cavity inside the cooling plate and is normally straight. In particular, it may have a circular cross-section. It is understood that the coolant channel is designed to contain and guide a coolant, e.g. water.

The cooling assembly further comprises a cooling pipe traversing a shell opening in the furnace shell and being connected to the cooling plate. The cooling pipe is normally made of a single piece of metal. Like the cooling plate, the cooling pipe is preferably made of a metal that comprises copper, i.e. it is made of copper or a copper alloy. Although the disclosure is not limited to this, the cooling pipe preferably has a circular cross-section. It has a pipe channel or inner duct, which normally also has a circular cross-section. To the outside, the pipe channel is delimited by a pipe wall of the cooling pipe. The cooling pipe traverses a shell opening in the furnace shell of the metallurgical furnace, i.e. the furnace shell has a shell opening (which could also be referred to as a shell through-opening or shell through-hole) that extends from the outside of the shell to the inside of the shell. The cross-section of the shell opening at least corresponds to the cross-section of the cooling pipe, normally it is somewhat larger so that there is a spacing between the cooling pipe and the furnace shell. The cooling pipe traverses the shell opening, i.e. it extends through the opening from the outside of the furnace shell to the inside. The cooling pipe is connected to the cooling plate. The connection is of course established so that the pipe channel communicates with the coolant channel. Here and in the following, "communicate" refers to an arrangement that allows for coolant exchange. In other words, the coolant channel and the pipe channel are connected so that coolant can flow from the coolant channel to the pipe channel and vice versa. The details of the connection between the cooling pipe and the cooling plate are not relevant in the context of the invention. There are various possibilities to this respect. Commonly, the cooling pipe is welded to the cooling plate.

The cooling assembly further comprises a compensator disposed around the cooling pipe for forming a seal between the cooling pipe and the furnace shell. The compensator is usually welded to the furnace shell and forms a collar around the cooling pipe, or more specifically around a portion of the cooling pipe near the furnace shell. The connection between the compensator and the cooling pipe is also usually a welded connection. The compensator normally is at least partially flexible so that it forms a flexible seal. According to a common design, the compensator comprises a bellows circumferentially disposed around the cooling pipe, which bellows provides a flexible seal that prevents gases or solid material from the inside of the blast furnace from escaping to the outside. It is also conceivable that the compensator is not directly connected to the furnace shell but via an intermediate element.

According to the invention, the method comprises performing at least one cutting operation with a cutting device comprising a fixture and a cutting tool that is movably connected to the fixture for a guided movement with respect to the fixture, wherein the fixture is mounted to the cooling pipe, whereby the cutting device is aligned with respect to the cooling pipe, and the cutting tool is guidedly moved while performing the cutting operation. The cutting operation may for example be performed in order to remove or dismantle a component of the cooling assembly or in order to modify a component by cutting off a portion of this component. In particular, this may be a cutting operation performed in proximity of the cooling pipe, e.g. within less than 15 mm or less than 10 mm of the cooling pipe. The cutting operation is performed with a cutting device. The cutting device may comprise several components that are detachably connected. It comprises a fixture, which may at least in some embodiments also be referred to as a bracket, a holder or a clamp. In some embodiments, the fixture may also be referred to as a centering fixture or centering device, if it is adapted to center the cutting device with respect to the cooling pipe.

A cutting tool is movably connected to the fixture for a guided movement with respect to the fixture. In other words, the connection between the cutting tool and the fixture is such that the cutting tool is not freely movable with respect to the fixture, but in a guided manner. One could also say that connection reduces the degrees of freedom of the cutting tool with respect to the fixture. The cutting tool can be connected to the fixture by a guiding mechanism or guiding element that defines the possible movement of the cutting tool. The cutting tool may be adapted for various cutting methods, e.g. mechanical cutting or thermal cutting. In general, the term "cutting tool" refers to that part of the cutting device that is adapted for the cutting process as such. This could be e.g. a cutting torch, a laser, a mechanical cutting head or insert or the like. First, the fixture is mounted to the cooling pipe, so that the cutting device is aligned with respect to the cooling pipe. Mounting the fixture to the cooling pipe may in particular comprise establishing a form lock between the fixture and the cooling pipe. By mounting the fixture to the cooling pipe, the cutting device is aligned with respect to the cooling pipe, i.e. the position and orientation of the cutting device is at least partially defined since the fixture is in a defined position with respect to the cooling pipe. Therefore, since the cutting tool is connected for a guided movement with respect to the fixture, it is also connected (via the fixture) for a guided movement with respect to the cooling pipe. When the fixture is mounted to the cooling pipe, the cutting tool can be moved guidedly (i.e. moved while being guided) with respect to the fixture (and the cooling pipe) while it performs the cutting operation.

This guided movement is highly advantageous since it reduces or no eliminates the possibility of a positioning error of the cutting tool. Any false positioning of the cutting tool could prevent a successful cutting operation and moreover could lead to accidental damages of elements that were not intended to be cut, in particular the cooling pipe. Proper positioning and movement of the cutting tool is therefore (more or less) failsafe as long as the fixture has been mounted properly and of course as long as the guiding mechanism has been designed properly. This, however, is an easy task if the intended location of the cutting operation is known with respect to the cooling pipe. Once the fixture has been mounted, an operator of the cutting device does not need to constantly verify the proper positioning of the cutting tool and therefore the cutting operation can be performed in a short time.

In general, there are various possibilities within the scope of the disclosure how the movement of the cutting tool could be guided. According to a preferred embodiment, the cutting tool is connected to the fixture to be movable along a predefined path transversal to an axial direction of the cooling pipe. The axial direction of the cooling pipe normally corresponds to a symmetry axis. Generally, any movement of the cutting tool can have an axial (or longitudinal) component, parallel to the axial direction, and a transversal component, perpendicular to the axial direction. In this embodiment, the movement is guided along a predefined path transversal to the axial direction, i.e. the transversal component of the movement is guided along this path. More specifically, the path may be a circular path, which could be centric or eccentric with respect to the center axis of the cooling pipe. The axial or longitudinal component of the movement can be restricted or unrestricted. In the latter case, the cutting tool can be moved parallel to the axial direction.

In some embodiments it may be sufficient to place the fixture on the cooling pipe so that a form lock is established which is sufficient for aligning the cutting device. It is preferred, though, that the fixture is firmly attached to the cooling pipe. This may be achieved by a frictional connection, which could be established by a locking screw or the like. In this case, the position of the fixture is locked with respect to the cooling pipe, making any unintentional movement of the fixture impossible. It is understood, though, that the connection is in any case a detachable connection so that the cutting device can be removed from the cooling pipe after the cutting operation.

Although the disclosure is not limited to this respect, the method normally comprises removing the compensator and installing a new compensator. Removing the old compensator usually involves one or a plurality of cutting operations to remove welded connections between the compensator and the cooling pipe, the furnace shell or other elements.

In particular, removing the compensator normally comprises a first cutting operation for removing a weld between the compensator and the cooling pipe. This weld is usually an annular welding seam circumferentially disposed around the cooling pipe. Since it is in contact with the cooling pipe, conventional cutting techniques pose a high risk of damaging the cooling pipe in the process. However, the inventive method reduces or eliminates any such risks due to the guided movement of the cutting tool.

The first cutting operation may be performed with a first cutting device comprising a first fixture and a first cutting tool, which is rotatable with respect to the first fixture. The first fixture is mounted to the cooling pipe and normally firmly attached thereto. The first cutting tool is rotatable with respect to the first fixture, normally so that it moves tangentially with respect to the cooling pipe. In other words, the above-mentioned path is a circular path, which is normally centered with respect to the cooling pipe. This corresponds to the circular shape of the welding seam.

Since the weld is disposed immediately on the cooling pipe, methods like flame cutting could likely damage the cooling pipe, even if the flame is carefully directed. It is therefore preferred that the first cutting tool is adapted to remove the weld by machining, in particular by milling. The first cutting tool may be a cutting head or milling head that could have an annular shape corresponding to the shape of the weld. If the annular cutting head is rotated about its center, it can gradually remove the weld e.g. while it is moved along the axial direction. In particular, the inner diameter of the cutting head may correspond to the outer diameter of the cooling pipe (plus a minor spacing necessary for free movement of the cutting head around the cooling pipe). However, apart from an annular cutting head it would be possible to move a cutting head or other cutting tool in a rotational movement around the first fixture and thus around the cooling pipe.

Especially when an annular cutting head is employed that is disposed around the cooling pipe, it is difficult to place the first fixture on an outer side of the cooling pipe without interfering with the first cutting tool. According to preferred embodiment, the first fixture is mounted on an inside of the cooling pipe. The first fixture can be a centering chuck that is inserted into the cooling pipe and then secured by a frictional connection. The centering chuck can be disposed on a shaft that is surrounded by a cylindrical sleeve that is rotatable around the shaft. The above-mentioned annular cutting head is disposed on one end of the cylindrical sleeve.

It should be noted that any welds or welding seams that need to be removed but are further away from the cooling pipe can be removed in a "conventional" way, i.e. without the inventive guided movement of a cutting tool. Also, these welds can be removed e.g. by flame cutting, since there is only a minor risk of damaging the cooling pipe.

After a longer operation time of the metallurgical furnace, e.g. several months, the cooling stave may be deformed to such an extent that the cooling pipe is in contact with the periphery of the shell opening, although the cross-section of the shell opening is larger than the cross-section of the cooling pipe. In such a case, the periphery of the shell opening forms a fix point for the cooling pipe, which can lead to unwanted mechanical stress and eventually to a fracture of the cooling pipe. In such a case, the method preferably comprises a second cutting operation for enlarging the shell opening. This means that by the second cutting operation, a portion of the furnace shell at the free of the shell opening is cut off. By this cutting operation, a possible fix point for the cooling pipe is eliminated. It should be understood that the terms "first" and "second" only used to distinguish these operations and it is within the scope of the disclosure to perform the "second cutting operation" without performing the "first cutting operation".

Preferably, the second cutting operation is performed with a second cutting device comprising a second fixture that is connected to an outside of the cooling pipe, wherein a mount for a second cutting tool is connected to the second fixture for a guided movement with respect to the second fixture and the second cutting tool performs the cutting operation while being held by the mount. In this embodiment, the cutting tool is not permanently connected to the other elements of the cutting device, but it is held by or received in a mount, which in turn is movably connected to the second fixture. During the second cutting operation, the cutting device can be fixedly attached to the mount, e.g. by a friction connection. The mount is connected to the second fixture for a guided movement, i.e. the movement of the mound with respect to the second fixture is restricted. Since the second cutting tool is held by the mount, it's movement with respect to the second fixture is also restricted. The second fixture is connected to an outside of the cooling pipe and may in particular be disposed circumferentially around the cooling pipe. Again, it is preferred that the second fixture is fixedly attached to the cooling pipe. The second cutting tool may in particular be a flame cutter or cutting torch.

The movement of the mount defines the movement of the second cutting tool and thus the contour of the enlarged shell opening. It is mostly practical or desirable that the shell opening has a circular cross-section or a cross-section that is nearly circular. Therefore, the mount is preferably connected for a circular movement. Accordingly, the second cutting tool moves along a circular path as it performs the second cutting operation.

According to one embodiment, the mount is connected for an eccentric movement with respect to the second fixture. This may in particular be an eccentric circular movement. This may have several advantages. For example, if a fix point on one side of the shell opening has been identified, the second cutting device can be aligned so that a larger portion of the furnace shell is cut out near the fix point, thereby selectively increasing the distance to the cooling pipe in this part of the shell opening. Also, by the eccentric movement, the path of the second cutting tool normally has to go less than 360° around the cooling pipe in order to complete the second cutting operation, which helps to save time. In such an embodiment, the second fixture may comprise an excenter ring around which the mount can be rotated.

The method may comprise, after removing the compensator, installing a hood, having at least one hood opening, on the furnace shell so that the hood sealingly covers at least one shell opening, and connecting at least one new compensator to a hood opening of the hood. The shape of the hood is not limited in this context but may in particular resemble a hollow shell, bowl or trough. The backside of the hood that faces the furnace shell is open. However, the front side of the hood, which faces away from the furnace shell, is not closed either but comprises at least one hood opening. The hood is arranged on the furnace shell so that it covers at least one shell opening. Commonly, the hood is welded to the furnace shell. Also, a new compensator is connected to each hood opening of the hood. The new compensator can be partially inserted into the hood opening or it may be disposed on an outside of the hood. It is usually welded to the hood. The new compensator may be connected to the hood before the hood is connected to the furnace shell or afterwards. The function of the hood is mainly to serve as an adapter if the cross-section of the shell opening is too large for the new compensator. This may in particular, but not exclusively, be the case if the shell opening has been enlarged as described above. The dimensions of the hood may be tailor-made, i.e. designed individually, for each shell opening and/or compensator. The inside of the new compensator communicates with the inside of the hood, which in turn communicates with the inside of the metallurgical furnace through the shell opening.

It is possible to use one hood for each new compensator. According to another embodiment, the hood has a plurality of hood openings and is installed so that it covers a plurality of shell openings and a plurality of new compensators are connected to a plurality of hood openings. In other words, a single hood is used for a plurality of new compensators while also covering a plurality of shell openings. In general, such a hood could e.g. have 2, 3 or 4 hood openings, but also higher numbers are conceivable.

As already mentioned above, thermal deformation of the cooling plate can considerably affect the orientation of the individual cooling pipes. For any orientation of the cooling pipe, the compensator should provide an effective seal without placing too much mechanical stress on the cooling pipe. To this respect, it is preferred that the new compensator is installed so that the cooling pipe passes through a sleeve portion of the compensator, which sleeve portion has an inner cross-section that increases towards the furnace shell. This sleeve portion may be disposed on one and of a bellows as described above. Its inner cross-section increases towards the furnace shell (or tapers in the opposite direction). At one end, the inner cross-section of the sleeve portion preferably corresponds to the outer cross-section of the cooling pipe, while at the other end, the inner cross-section is somewhat larger. This allows for different angular orientations of the cooling pipe within the sleeve portion while still maintaining a relatively tight connection at the one end.

BRIEF DESCRIPTION OF THE DRAWINGS

Preferred embodiments of the disclosure will now be described, by way of example, with reference to the accompanying drawings, in which.

DETAILED DESCRIPTION OF THE DRAWINGS

Figure 1:
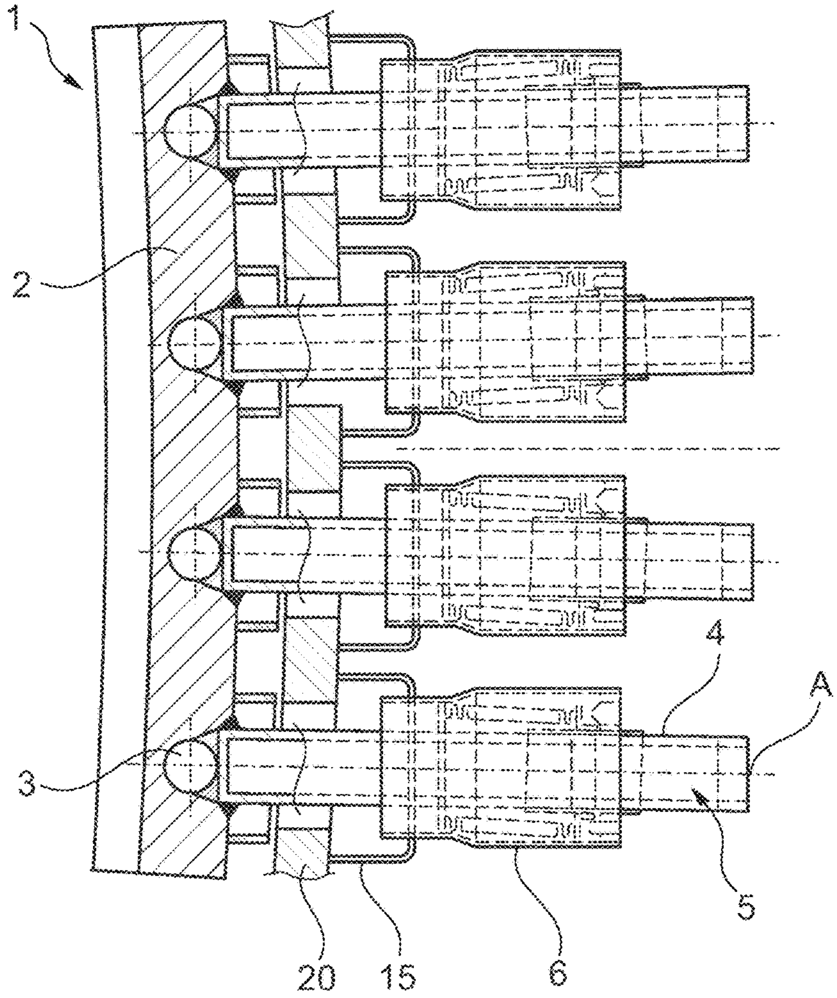
FIG. 1 is a sectional view of a cooling assembly with old compensators.

FIG. 1 shows a sectional view of a cooling assembly 1 for a metallurgical furnace, e.g. a blast furnace, before repair. The cooling assembly 1, a detail of which is also shown in the sectional view of FIG. 2, comprises a cooling plate 2 made of copper or a copper alloy. The cooling plate 2, is disposed inside of a furnace shell 20 of the metallurgical furnace. The surface of the cooling plate 2 is shown as plain here, but it could comprise a plurality of ribs and grooves for increasing the surface area. Also, it could be provided with a refractory lining, which is not shown here for sake of simplicity. A plurality of coolant channels 3 are provided in the cooling plate 2.

The cooling assembly 1 also comprises a plurality of cooling pipes 4, each of which has a pipe channel 5 that is connected to a cooling channel 3. The cooling pipe 4 can be made of the same material as the cooling plate 2. Each of the cooling pipes 4 passes through a shell opening 20.1 in the furnace shell 20. The cross-section of the respective shell opening 20.1 is chosen to be larger than the cross-section of the respective cooling pipe 4 to allow for some movement of the cooling pipe 4 with respect to the furnace shell 20. Such movement may in particular result from a thermally induced deformation of the cooling plate 2, to which the cooling pipes 4 are attached. Each cooling pipe 4 extends along an axial direction A that corresponds to a symmetry axis of the respective cooling pipe 4. However, the axial directions A of different cooling pipes 4 are generally not parallel.

A hood 15 may be connected to the furnace shell 20 so that it covers the shell openings 20.1. The hood 15 has a hood opening 15.1 through which a cooling pipe 4 is passed. On an outer side of the hood 15, the cooling pipe 4 is surrounded by a compensator 6, which is welded to the hood 15 so that it is connected to hood opening 15.1. The structure of the compensators 6 can be seen in detail in FIG. 2. It comprises a cylindrical portion 7 that is connected by welding to the hood 15. A bellows 9 is connected to the cylindrical portion 7 by a ring portion 8. An annular sleeve portion 10 is connected on the one hand to the bellows 9 and on the other hand to the outside of the cooling pipe 4. The connection to the cooling pipe 4 is established through an annular first weld 11.

For various reasons, the cooling assembly 1 may need a repair that requires removing the compensators 6 and the hood 15. For this purpose, the first weld 11 connecting the cooling pipe 4 to the compensator sleeve portion 10, a second weld 12 connecting the cylindrical portion 7 to the hood 15 and a third weld 13 connecting the hood 15 to the furnace shell 20 need to be removed. One reason for a repair may be that a compensator 6 or the hood 15 have been damaged. Another reason may be that due to the thermal deformation of the cooling plate 2, one of the cooling pipes 4 has come into contact with a periphery of a shell opening 20.1. In this case, a fix point for the cooling pipe 4 is formed, which hinders movement with respect to the furnace shell 20 and induces mechanical stress that could ultimately lead to a fracture in the cooling pipe 4 itself or in the connection between the cooling pipe 4 and the cooling plate 2. Whether such a direct contact has occurred can be determined for example by endoscopy during a stoppage of the furnace. If such a contact is present, the shell opening 20.1 should be enlarged to remove this issue.

Any of the repair measures coincides with a potential risk of damaging the cooling pipe 4. This risk is minimised or eliminated according to the maintenance method which will be described in the following.

Figure 3:
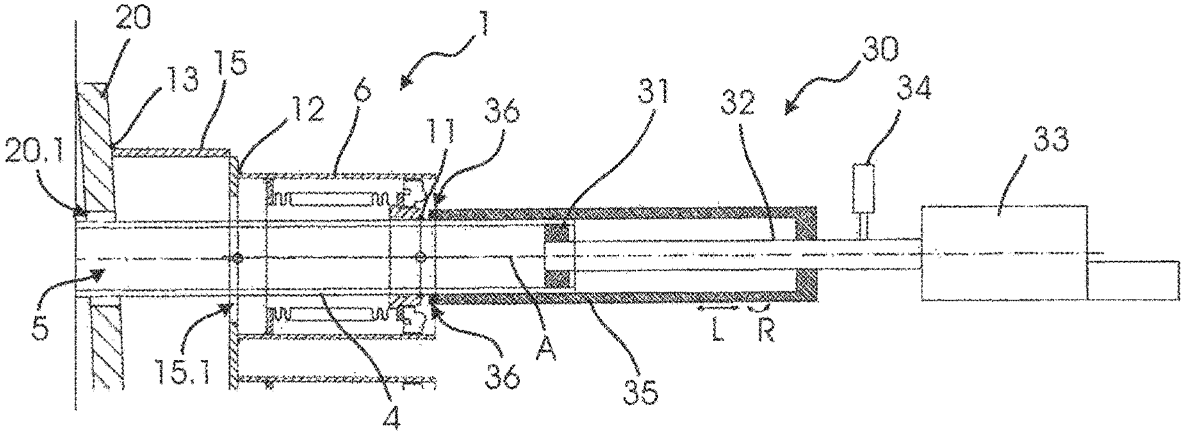
FIG. 3 is a sectional view illustrating a first cutting operation according to the invention.

The first weld 11 is removed by a first cutting operation that is illustrated in FIG. 3. For this purpose, special first cutting device 30 is employed.

Figure 2:
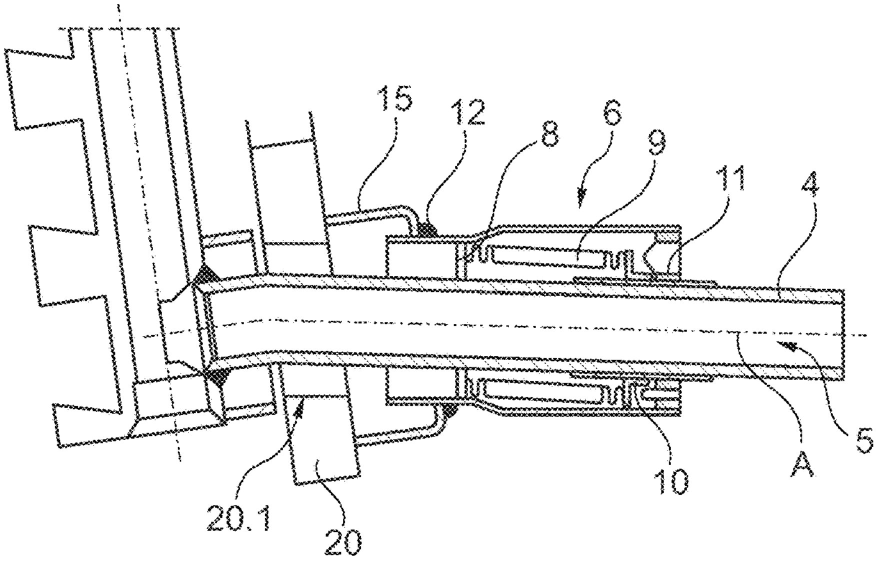
FIG. 2 is a detail view of a part of the cooling assembly from FIG. 1.
Figure 8:
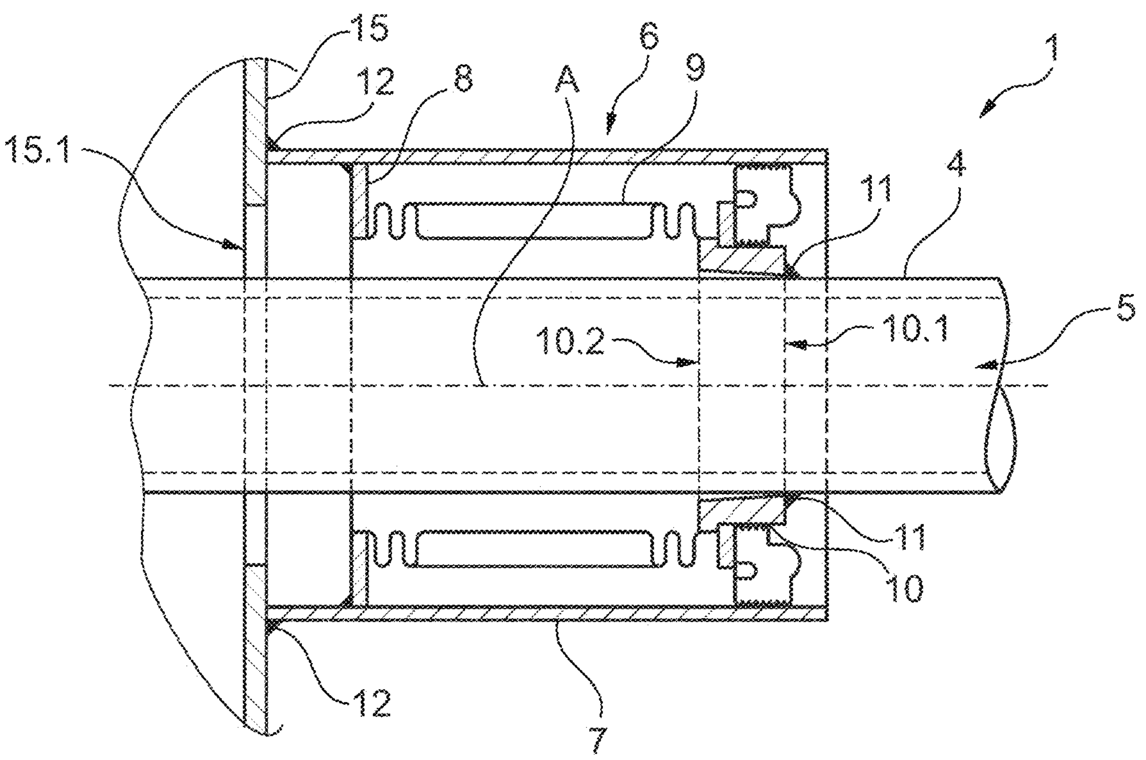
FIG. 8 is a detail view of a part of the cooling assembly from FIG. 1 with a new compensator.

It should be noted that, although FIG. 3 shows the first cutting operation in connection with a new compensator, i.e. a compensator of the new type, as shown in FIG. 8, the first cutting operation is of course also and primarily designed to be used with an old compensator, i.e. a compensator of the old type, as shown in FIG. 2.

The first cutting device 30 comprises a centring chuck 31 that is disposed at an end of a shaft 32. A fastening device 34 is connected to the shaft 32. A cylindrical cutting sleeve 35 is disposed circumferentially around the shaft 32. At an open end of the cutting sleeve 35, an annular cutting head (or milling head) 36 is disposed. The cutting sleeve 35 and thus the cutting head 36 are movably connected to the shaft 32. On the one hand, the cutting sleeve 35 can perform a longitudinal movement L with respect to the shaft 32, on the other hand it can perform a circular or rotational movement R, which is driven by a drive unit 33 disposed at one end of the shaft 32 opposite the centring chuck 31.

The centring chuck 31 is placed inside the cooling pipe 4 and secured in its position by operating the fastening device 34. Thus, the first cutting device 30 is aligned with respect to the cooling pipe 4. Then, the drive unit 33 is turned on so that the cutting head 36 rotates around the cooling pipe 4 and the cutting sleeve 35 is gradually moved towards the sleeve portion 10, whereby the first weld 11 is removed by machining, or more specifically, by milling. Since the position and the movement of the cutting head 36 are guided by the connection established via the centring chuck 31, the first weld 11 can be removed precisely and without the need for an operator to check the position of the cutting head 36 over and over again. The first cutting operation can therefore be performed very time-effectively. Also, since the first weld is removed by machining, there is no risk of damaging the cooling pipe 4 e.g. by flame cutting. When the first weld 11 has been removed in the depicted way, the second weld 12 and the third weld 13 can be removed by flame cutting, since these welds 12, 13 are disposed further away from the cooling pipe 4, so there is minimal risk of damaging the cooling pipe 4.

Figure 4:
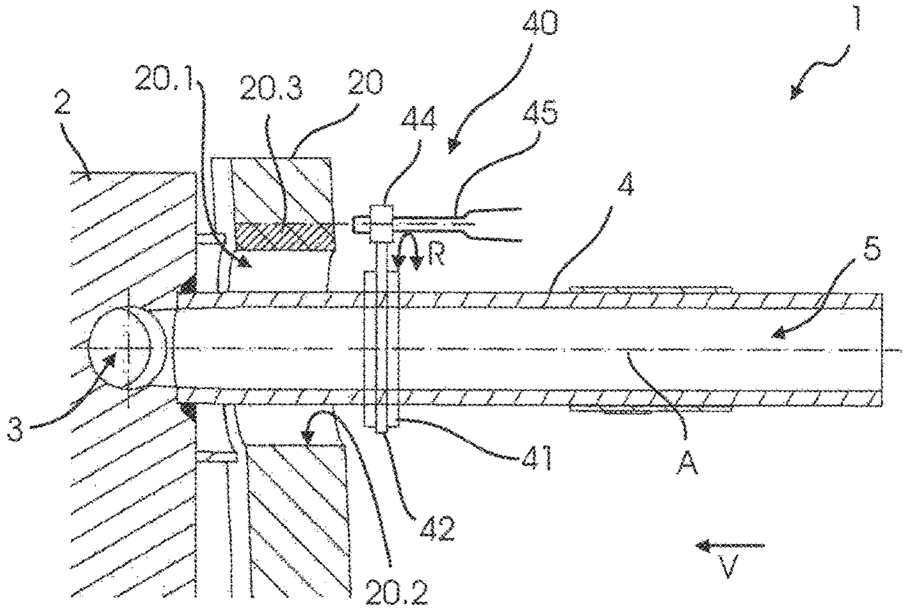
FIG. 4 is a sectional view illustrating a second cutting operation according to the invention.
Figure 5:
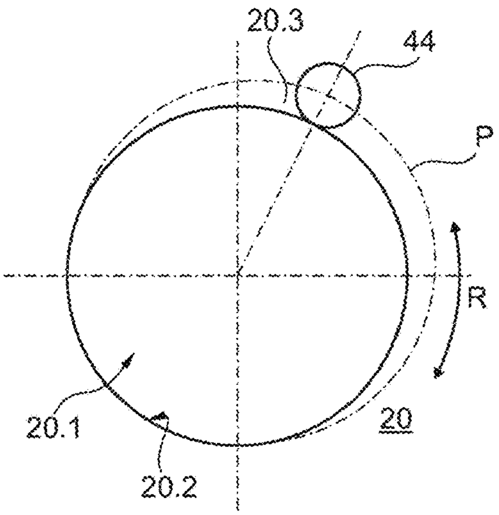
FIG. 5 is a view along the direction V in FIG. 4.

When the compensators 6 and the hood 15 have been removed, any of the shell openings 20.1 can be enlarged if necessary. This is done by a second cutting operation illustrated in FIG. 4. An annular second fixture 41 of a second cutting device 40 is circumferentially placed around the cooling pipe 4 and secured thereto by means not depicted here. A guide element 42 is connected to the second fixture 41 so that it is eccentrically movable with respect to the second fixture 41. A holder 44 is attached to the guide element 42. Once the second fixture 41 has been secured to the cooling pipe 4, a cutting torch 45 is inserted into the holder 44. The cutting torch 45 is turned on and cuts through the furnace shell 20. By the guiding function provided through the second fixture 41, the guide element 42 and the holder 40, the cutting torch 45 is moved along a circular path P shown in FIG. 5. In other words, the movement of the cutting torch 45 is guided transversal to the axial direction A along the circular path P, which corresponds to a circular or rotational movement R. Optionally, the holder 44 could allow for a movement of the cutting torch 45 along the axial direction A, but normally the cutting torch 45 is fixedly received inside the holder 44. Once the cutting torch 45 has completed its movement along the path P, a portion 20.3 of the furnace shell 20 near the periphery 20.2 of the shell opening 20.1 has been cut out, thereby enlarging the shell opening 20.1.

Figure 6:
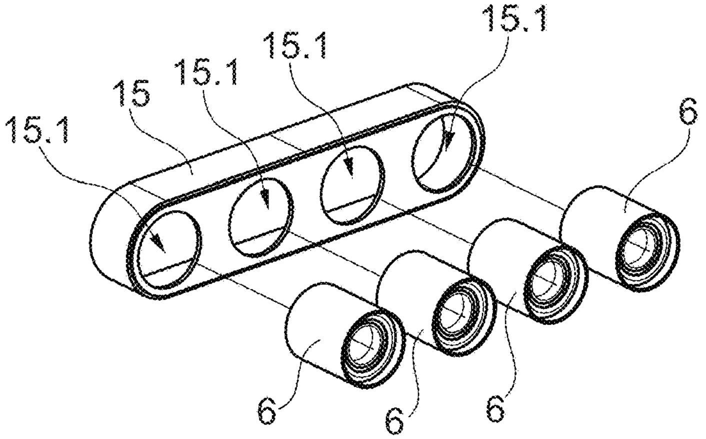
FIG. 6 is perspective view of a hood and a plurality of compensators.
Figure 7:
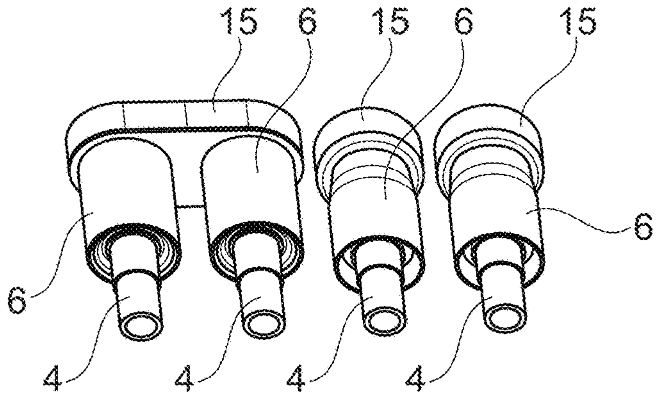
FIG. 7 is a perspective view of a plurality of hoods with compensators and cooling pipes.

Afterwards, a new hood 15 and a new compensator 6 can be installed. The dimensions of the new hood 15 of course have to be selected so that the shell opening 20.1 is fully covered, even if it has been enlarged as described above. They can be designed individually for each installation. In this context, there are various possibilities which are illustrated in FIGS. 6 and 7. As shown in FIG. 6, a single hood 15 with four hood openings 15.1 could be combined with four compensators 6. However, smaller hoods 15 can be used and combined with a lower number of compensators. As shown on the left-hand side of FIG. 7, a single hood 15 with two hood openings 15.1 can be combined with two compensators 6. As shown on the right-hand side of FIG. 7, it is also possible to combine one compensator 6 with a single hood 15. The design of the new compensators 6 corresponds to the one shown in FIG. 2. The hood 15 may have different hood designs is to cover all possible repair cases. If a number of pipes are covered with a single hood, erection time for new compensators can be reduced, thereby keeping the shut-down time of the metallurgical furnace to a minimum.

FIG. 8 shows a cooling pipe connection with a new compensator. A hood 15 may be connected to the furnace shell 20 so that it covers the shell openings 20.1. The hood 15 has a hood opening 15.1 through which a cooling pipe 4 is passed. The hood 15 may be covering more than one shell opening 20.1. Such a hood then comprises more than one hood opening 15.1, one for each cooling pipe 4. On an outer side of the hood 15, the cooling pipe 4 is surrounded by a new compensator 6, which is welded to the hood 15 so that it is connected to hood opening 15.1. The structure of the compensators 6 can be seen in detail in FIG. 8. It comprises a cylindrical portion 7 that is connected by welding to the hood 15. A bellows 9 is connected to the cylindrical portion 7 by a ring portion 8. An annular sleeve portion 10 is connected on the one hand to the bellows 9 and on the other hand to the outside of the cooling pipe 4. The connection to the cooling pipe 4 is established through an annular first weld 11.

An important feature of the new compensator 6 is that the sleeve portion 10 has an inner diameter that increases towards the furnace shell 20, i.e. it increases from an outer end 10.1 towards an inner end 10.2. In other words, the inside surface of the sleeve portion 10 is not cylindrical but conical. This allows for different angular orientations of the sleeve portion 10 with respect to the cooling pipe 4, while still minimising the distance between the sleeve portion 10 and the cooling pipe 4 at the outer end 10.1, where the first weld 11 is applied.

The invention claimed is:

1. A method for maintenance of a cooling assembly for a metallurgical furnace, the cooling assembly comprising:

a cooling plate disposed inside of a furnace shell of the metallurgical furnace;

a cooling pipe traversing a shell opening in the furnace shell and being connected to the cooling plate; and a compensator disposed around the cooling pipe for forming a seal between the cooling pipe and the furnace shell, wherein the method includes performing at least one cutting operation with at least one cutting device comprising at least one fixture and a cutting tool that is movably connected to the fixture for a guided movement with respect to the fixture, wherein the fixture is mounted to the cooling pipe, whereby the cutting device is aligned with respect to the cooling pipe, and the cutting tool is guidedly moved while performing the cutting operation.

2. The method according to claim 1, wherein the cutting tool is connected to the fixture to be movable along a predefined path transversal to an axial direction of the cooling pipe.

3. The method according to claim 1, wherein the fixture is firmly attached to the cooling pipe.

4. The method according to claim 1, further including the step of removing the compensator and installing a new compensator.

5. The method according to claim 4, whereby removing the compensator comprises a first cutting operation of the at least one cutting operation for removing a weld between the compensator and the cooling pipe.

6. The method according to claim 5, whereby the first cutting operation is performed with a first cutting device of the at least one cutting device comprising a first fixture of the at least one fixture and a first cutting tool, which is rotatable with respect to the first fixture.

7. The method according to claim 6, wherein the first cutting tool is adapted to remove the weld.

8. The method according to claim 6, wherein the first fixture is mounted on an inside of the cooling pipe.

9. The method according to claim 5, further including a second cutting operation of the at least one cutting operation for enlarging the shell opening.

10. The method according to claim 9, whereby the second cutting operation is performed with a second cutting device of the at least one cutting device comprising a second fixture of the at least one fixture that is connected to an outside of the cooling pipe, wherein a mount for a second cutting tool is connected to the second fixture for a guided movement with respect to the second fixture and the second cutting tool performs the cutting operation while being held by the mount.

11. The method according to claim 10, wherein the mount is connected for a circular movement.

12. The method according to claim 10, wherein the mount is connected for an eccentric movement with respect to the second fixture.

13. The method according to claim 4, further including the following steps: after removing the compensator, installing a hood, having at least one hood opening of a plurality of hood openings, on the furnace shell so that the hood sealingly covers at least one shell opening, and connecting at least one new compensator of a plurality of new compensators to a hood opening of the hood.

14. The method according to claim 13, wherein the hood has the plurality of hood openings and is installed to cover a plurality of shell openings, and the plurality of new compensators are connected to the plurality of hood openings.

15. The method according to claim 4, wherein the new compensator is installed so that the cooling pipe passes through a sleeve portion of the new compensator, wherein the sleeve portion has an inner cross-section that increases towards the furnace shell.

* * * * *